United States Patent [19]

Ishizumi et al.

[11] 3,860,575
[45] Jan. 14, 1975

[54] PURIFICATION OF BENZODIAZEPINE DERIVATIVES

[75] Inventors: Kikuo Ishizumi, Ikeda; Kazuo Mori, Kobe; Tadashi Okamoto, Ashiya; Takeshi Akase, Nishinomiya; Takahiro Izumi, Takarazuka; Mitsuhiro Akatsu, Toyonaka; Yoshiharu Kume; Shigeho Inaba, both of Takarazuka; Hisao Yamamoto, Nishinomiya, all of Japan

[73] Assignee: Sumitomo Chemical Company, Limited, Osaka, Japan

[22] Filed: Apr. 3, 1972

[21] Appl. No.: 240,804

[30] Foreign Application Priority Data
Apr. 12, 1971 Japan.................................. 46-23249

[52] U.S. Cl............................ 260/239 BD, 424/244
[51] Int. Cl............................................. C07d 53/06
[58] Field of Search............................. 260/239 BD

[56] References Cited
UNITED STATES PATENTS
3,109,843 11/1963 Reeder et al................. 260/239 BD OTHER PUBLICATIONS
McElvain, The Characterization of Organic Compounds, (New York, 1947), pages 63–69, 112–117 and 169.

Primary Examiner—Alton D. Rollins
Attorney, Agent, or Firm—Stevens, Davis, Miller & Mosher

[57] ABSTRACT

A process for purifying a crude 2,3-dihydro-1H-1,4-benzodiazepine derivative having effects as tranquilizers, anti-spasmodics and muscle-relaxants, represented by the formula,

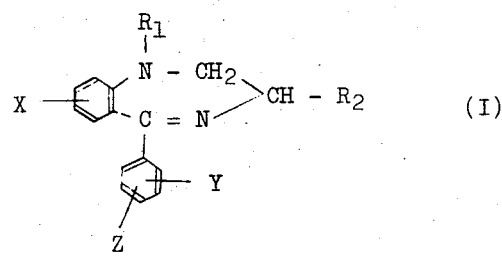

wherein $R_1$ is a lower $(C_1 - C_4)$ alkyl, cyclo $(C_3 - C_6)$ alkyl-$(C_1 - C_4)$ alkyl, $(C_1 - C_4)$ alkoxy-$(C_1 - C_4)$ alkyl, or $(C_1 - C_3)$ acyloxy-$(C_1 - C_4)$ alkyl; $R_2$ is hydrogen or a lower $(C_1 - C_4)$ alkyl; X is hydrogen or a halogen, nitro or trifluoromethyl; and Y and Z are individually hydrogen, a halogen, a lower $(C_1 - C_4)$ alkyl or nitro, treating the crude product with an acylating agent to acylate an impurity contained in the crude product, and then extracting the reaction mixture with an acid to recover the objective 2,3-dihydro-1H-1,4-benzodiazepine derivative of formula (I).

2 Claims, No Drawings

PURIFICATION OF BENZODIAZEPINE DERIVATIVES

This invention relates to a process for purifying 2,3-dihydro-1H-1,4-benzodiazepine derivatives.

More particularly, the present invention pertains to a process for the purification of 2,3-dihydro-1H-1,4-benzodiazepine derivatives represented by the formula (I),

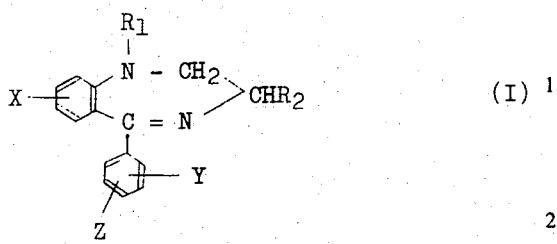

wherein $R_1$ is a lower ($C_1 - C_4$) alkyl, cyclo ($C_3 - C_6$) alkyl-($C_1 - C_{alkyl.} - C_4$) alkoxy-($C_1 - C_4$) alkyl or ($C_1 - C_3$) acyloxy-($C_1 - C_4$) alkyl group; $R_2$ is a hydrogen atom or a lower ($C_1 - C_4$) alkyl group; X is a hydrogen or halogen atom, or a nitro or trifluoromethyl group; and Y and Z are individually a hydrogen or halogen atom, or a lower ($C_1 - C_4$) alkyl or nitro group.

The 2,3-dihydro-1H-1,4-benzodiazepine derivatives represented by the above-mentioned formula (I) have prominent effects as tranquilizers, anti-convulsants and muscle-relaxants, and are useful as medicines. The present invention provides a commercially advantageous process for the purification of such therapeutically valuable compounds.

As for a process for producing the above-mentioned 2,3-dihydro-1H-1,4-benzodiazepine derivatives, of the formula (I), Journal of Organic Chemistry, Vol. 28, page 2456 (1963), for example, discloses a process in which benzodiazepin-2-one derivatives represented by the formula (II).

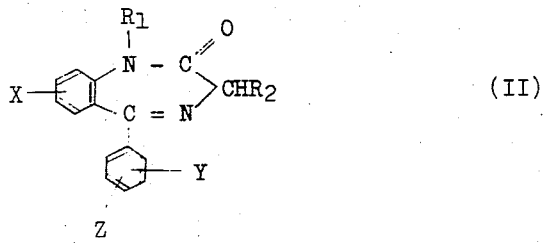

wherein $R_1$, $R_2$, X, Y and Z are the same as defined above, are subjected to reduction with lithium aluminum tetrahydride. Furthermore, the present inventors have found the fact that when diborane is used as the reducing agent, the above-mentioned reduction progresses more advantageously. However, it is observed that a crude 2,3-dihydro-1H-1,4-benzodiazepine derivative obtained according to any of the above-mentioned reduction reactions contains a more or less amount of a tetrahydro compound represented by the formula (III),

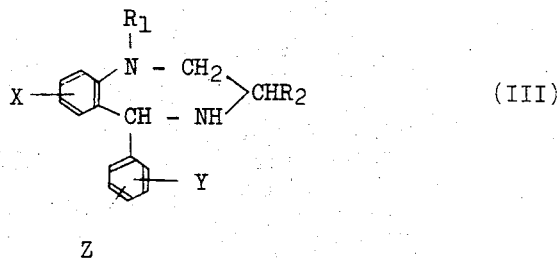

wherein $R_1$, $R_2$, X, Y and Z are the same as defined above. The present invention is concerned with a process for removing said tetrahydro compound of the formula (III) most effectively with minimum loss of the objective 2,3-dihydro-1H-1,4-benzodiazepine derivative of the formula (I).

For the removal of said tetrahydro compound of the formula (III), there has heretofore been adopted a recrystallization method or a column chromatographic method. However, the recrystallization method is not economical because the recrystallization yield decreases with increasing content of the tetrahydro compound of the formula (III). Further, the column chromatographic method cannot be said to be commercially advantageous.

With an aim to overcome the drawbacks of the above-mentioned prior art processes, the present inventors made extensive studies. As the result, the inventors have found that when a 2,3-dihydro-1H-1,4-benzodiazepine derivative of the formula (I) which is obtained by the reduction of a corresponding benzodiazepin-2-one derivative of the formula (II) is purified in such a manner that the crude product containing a tetrahydro compound of the formula (III) is treated with an acylating agent to convert the tetrahydro compound into an acyl compound represented by the formula (IV),

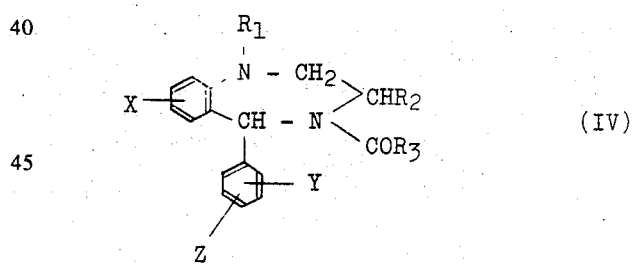

wherein $R_1$, $R_2$, X, Y and Z are the same as defined above; and $R_3$ is a hydrogen atom, or a lower alkyl or aryl group, and is then extracted with an acid, the acyl compound of the formula (IV) is not extracted and only the objective 2,3-dihydro-1H-1,4-benzodiazepine derivative of the formula (I) is selectively extracted.

That is, it has been found that the pure dihydro compound of the formula (I) can be isolated after acylating the contaminating tetrahydro compound of the formula (III) to more readily separable acylated compound of the formula (IV).

The acylation reaction is effected by use of an acylating agent such as acetic anhydride or the like alkanoic acid anhydride or an acyl halide, in the absence or presence of an inert solvent such as tetrahydrofuran or the like ether, or benzene, toluene or the like hydrocarbon, and in the absence or presence of a tertiary organic base having a function as an acid acceptor.

In conducting the above reaction, the temperature is not critical, and may be room temperature or below or the reflux temperature of the solvent used.

After completion of the acylation, the 2,3-dihydro-1H-1,4-benzodiazepine derivative of the formula (I) is extracted with an acid from the reaction mixture. When the acylation reaction has been effected in the absence of a solvent, the extraction is desirably effected after addition of a suitable solvent, while in case the reaction mixture is in the form of a liquid and is acidic, the extraction is desirably effected after neutralization. Examples of the solvent used in the above case include hydrocarbons such as benzene, toluene and xylene, and ordinary organic solvents such as ethers, chloroform and acetic acid esters. The acid to be used for the extraction is desirably a mineral acid such as hydrochloric or sulfuric acid, and is used preferably at a concentration of 5 percent or less.

The acid extract obtained in the above manner is neutralized to give in high purity the objective 2,3-dihydro-1H-1,4-benzediazepine derivative of the formula (I).

2,3-Dihydro-1H-1,4-benzodiazepine derivatives of the formula (I) purified according to the above-mentioned process may be converted into acid addition salts by treatment with such an inorganic or organic acid as hydrochloric, sulfuric, phosphoric, succinic, acetic, maleic, fumaric or tartaric acid.

According to the process of the present invention, it is possible to purify, for example, the following 2,3-dihydro-1H-1,4-benzodiazepine derivatives:

1-Methyl-5-phenyl-7-chloro-2,3-dihydro-1H-1,4-benzodiazepine

1-Ethyl-5-phenyl-7-chloro-2,3-dihydro-1H-1,4-benzodiazepine

1-Cyclopropylmethyl-5-phenyl-7-chloro-2,3-dihydro-1H-1,4-benzodiazepine

1-Methyl-7-nitro-5-phenyl-2,3-dihydro-1H-1,4-benzodiazepine

1-Methyl-5-(o-chlorophenyl)-7-chloro-2,3-dihydro-1H-1,4-benzodiazepine

1-Methyl-5-(o-fluorophenyl)-7-chloro-2,3-dihydro-1H-1,4-benzodiazepine

1-Methyl-5-(2′,6′-difluorophenyl)-7-chloro-2,3-dihydro-1H-1,4-benzodiazepine 1-($\beta$-Methoxyethyl)-5-phenyl-7-chloro-2,3-dihydro-1H-1,4-benzodiazepine 1-($\beta$-Ethoxyethyl)-5-phenyl-7-chloro-2,3-dihydro-1H-1,4-benzodiazepine 1-($\beta$-Methoxypropyl)-5-(o-fluorophenyl)-2,3-dihydro-1H-1,4-benzodiazepine 1-($\beta$-Acetoxyethyl)-5-phenyl-7-chloro-2,3-dihydro-1H-1,4-benzodiazepine 1-Cyclopropylmethyl-5-(o-fluorophenyl)-7-chloro-2,3-dihydro-1H-1,4-benzodiazepine 1-Cyclobutylmethyl-5-phenyl-7-nitro-2,3-dihydro-1H-1,4-benzodiazepine The process of the present invention is further disclosed in the following examples of preferred embodiments thereof, which are presented for the purpose of illustration and are not intended to limit the scope of the invention.

EXAMPLE 1

To a suspension of 2.28 g of sodium borohydride in 35 ml of tetrahydrofuran was added dropwise with stirring a solution of 13.0 g of boron trifluoride etherate in 10 ml of tetrahydrofuran below 10°C, and the mixture was stirred at room temperature for 45 minutes. To the mixture was added dropwise solution of 1.43 g of 1-methyl-5-phenyl-7-chloro-1,3-dihydro-2H-1,4-benzodiazepin-2-one in 10 ml of tetrahydrofuran at −15° to −12.5°C over a period of 5 minutes, and then the mixture was stirred at −15°C for 22 hours. The reaction mixture was poured into 100 ml of ice-water, and then 20 ml of concentrated hydrochloric acid was added. The mixture was refluxed for 30 minutes, then cooled, and neutralized with concentrated ammonia. The tetrahydrofuran layer was separated, and the aqueous layer was extracted with ether. The combined organic layer was washed with water and dried over anhydrous sodium sulfate, and the solvent was removed under reduced pressure to obtain 1.4 g of an oily residue.

According to NMR analysis using carbon tetrachloride, the thus obtained oily substance was composed of 1-methyl-5-phenyl-7-chloro-2,3-dihydro-1H-1,4-benzodiazepine and 1-methyl-5-phenyl-7-chloro-2,3,4,5-tetrahydro-1H-1,4-benzodiazepine in a ratio of 86 : 14. This mixture was dissolved in 5 ml.. of acetic anhydride. After stirring at room temperature for 4 hours, the resulting solution was diluted with 30 ml. of ice-water, neutralized with concentrated aqueous ammonia and then extracted with ether. After the ether layer was re-extracted with 0.1N-hydrochloric acid, the hydrochloric acid extracts were neutralized with concentrated aqueous ammonia and then extracted with ether. After drying the extract with anhydrous sodium sulfate, the ether was removed by distillation under reduced pressure, and the resulting oily residue was crystallized from n-hexane to obtain 1.02 g. (75 percent) of crystals of 1-methyl-5-phenyl-7-chloro-2,3-dihydro-1H-1,4-benzodiazepine having a melting point of 99.5° to 101.0°C. Recrystallization from n-hexane gave colorless needles having a melting point of 100.0° to 100.8°C.

EXAMPLE 2

To a suspension of 7.1 g of sodium borohydride in 150 ml of tetrahydrofuran was added dropwise with stirring a solution of 39.0 g of boron trifluoride etherate in 25 ml of tetrahydrofuran below 10°C, and the mixture was stirred at room temperature for 1 hour. To the mixture was added dropwise solution of 7.12 g of 1-methyl-5-phenyl-7-chloro-1,3-dihydro-2H-1,4-benzodiazepin-2-one in 35 ml of tetrahydrofuran at −8°C over a period of 15 minutes, and then the mixture was stirred at −5°C for 5.5 hours. 20 Ml of water followed by 130 ml of 13.5 percent hydrochloric acid was added to that mixture below −12°C to decompose the excess diborane. The mixture was refluxed for 30 minutes, then cooled, and neutralized with 130 ml of 20 percent aqueous sodium hydroxide. The tetrahydrofuran was removed by distillation under reduced pressure, and the residual aqueous layer was extracted with 300 ml of toluene. The organic layer was washed with water and dried over anhydrous sodium sulfate, and toluene was partially removed under reduced pressure to obtain a solution of a mixture of 1-methyl-5-phenyl-7-chloro-2,3-dihydro-1H-1,4-benzodiazepine and 1-methyl-5-phenyl-7-chloro-2,3,4,5-tetrahydro-1H-1,4-benzodiazepine in 60 ml of toluene. The proportions of the dihydro- and tetrahydro-benzodiazepines in the mixture was found to be 77 : 23 by NMR analysis. To the solution was added 5.5 g of acetic anhydride below 5°C. After stirring at 3° to 5°C for 15 minutes, the resulting solution was diluted with 20 ml of cold water, neutralized with 20 percent aqueous sodium hydroxide, and extracted with 50 ml of toluene. The toluene layer was washed with water and extracted with 200 ml of 0.24N hydrochloric acid. The hydrochloric acid extract was washed with toluene and then neutralized with 115 ml of 2 percent aqueous sodium hydroxide at 47° – 50°C over a period of 20 minutes. The precipitate was collected by filtration, washed with water and dried to obtain 5.0 g (74 percent) of 1-methyl-5-phenyl-7-chloro-2,3-dihydro-1H-1,4-benzodiazepine, m.p. 96° –98°C. Recrystallization from n-hexane gave colorless needles having a melting point of 100.0° to 101.0°C.

EXAMPLE 3

To a suspension of 2.28 g of sodium borohydride in 30 ml of tetrahydrofuran was added dropwise with stirring a solution of 13.0 g of boron trifluoride etherate in 10 ml of tetrahydrofuran below 15°C, and the mixture was stirred at room temperature for 1 hour. To the mixture was added dropwise solution of 1.63 g of 1-cyclopropylmethyl-5-phenyl-7-chloro-1,3-dihydro-2H-1,4-benzodiazepin-2-one in 10 ml of tetrahydrofuran at −15° to −13°C over a period of 12 minutes, and then the mixture was stirred at −15°C for 23 hours. The reaction mixture was poured into 100 ml of ice-water, and then 20 ml of concentrated hydrochloric acid was added. The mixture was refluxed for 50 minutes, then cooled, and neutralized with concentrated ammonia. The tetrahydrofuran layer was separated, and the aqueous layer was extracted with ether. The combined organic layer was washed with water and dried over anhydrous sodium sulfate, and the solvent was removed under reduced pressure to obtain 1.6 g of an oily residue.

According to NMR analysis using carbon tetrachloride, the thus obtained oily substance was composed of 1-cyclopropylmethyl-5-phenyl-7-chloro-2,3-dihydro-1H-1,4-benzodiazepine and 1-cyclopropylmethyl-5-phenyl-7-chloro-2,3,4,5-tetrahydro-1H-1,4-benzodiazepine in a ratio of 7 : 3. This oily substance was dissolved in 5 ml of acetic anhydride. After stirring at room temperature for 4 hours, the solution was diluted with 20 ml of ice-water, neutralized with concentrated aqueous ammonia and then extracted with ether. The ether layer was re-extracted with 0.1N-hydrochloric acid, neutralized with concentrated aqueous ammonia and then extracted with ether. After drying the extract with anhydrous sodium sulfate, the ether was removed by distillation under reduced pressure, and the resulting oily residue was crystallized from n-hexane to obtain 0.78 (50 percent) of crystals of 1-cyclopropylmethyl-5-phenyl-7-chloro-2,3-dihydro-1H-1,4-benzodiazepine. Recrystallization from isopropylether gave colorless prisms having a melting point of 79°C.

EXAMPLE 4

To a suspension of 2.28 g of sodium borohydride in 35 ml of tetrahydrofuran was added dropwise with stirring a solution of 13.0 g of boron trifluoride etherate in 10 ml of tetrahydrofuran below 10°C, and the mixture was stirred at room temperature for 45 minutes. To the mixture was added dropwise solution of 1.43 g of 1-methyl-5-phenyl-7-nitro-1,3-dihydro-2H-1,4-benzodiazepin-2-one in 10 ml of tetrahydrofuran at −15° to −12.5°C over a period of 5 minutes, and then the mixture was stirred at −15°C for 22 hours. The reaction mixture was poured into 100 ml of ice-water, and then 20 ml of concentrated hydrochloric acid was added. The mixture was refluxed for 2 hours, then cooled, and neutralized with concentrated ammonia. The tetrahydrofuran layer was separated, and the aqueous layer was extracted with chloroform. The combined organic layer was washed with water and dried over anhydrous sodium sulfate, and the solvent was removed under reduced pressure to obtain 1.4 g of crude 1-methyl-5-phenyl-7-nitro-2,3-dihydro-1H-1,4-benzodiazepine.

This solid was dissolved in 5 ml of acetic anhydride. After stirring at room temperature for 4 hours, the mixture was diluted with 30 ml of ice-water, neutralized with concentrated aqueous ammonia and then extracted with chloroform. The chloroform layer was re-extracted with 0.24N-hydrochloric acid, neutralized with concentrated aqueous ammonia and then extracted with chloroform. After drying the extract with anhydrous sodium sulfate, the chloroform was removed by distillation under reduced pressure to obtain 1.2 g of crystals of 1-methyl-5-phenyl-7-nitro-2,3-dihydro-1H-1,4-benzodiazepine. Recrystallization from isopropanol gave 1.08 g (77 percent) of yellow plates having a melting point of 185.5° to 186.5°C.

What is claimed is:

1. A process for purifying 2,3-dihydro-1H-1,4-benzodiazepine derivative represented by the formula,

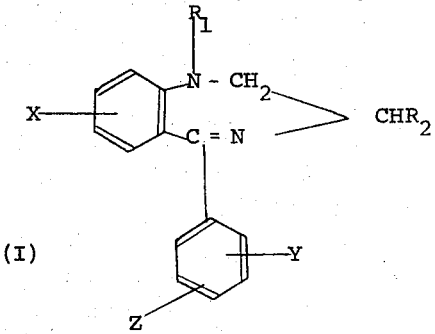

(I)

wherein $R_{hydrogenation.}$ is a lower $(C_1 - C_4)$ alkyl, cyclo $(C_3 - C_6)$ alkyl-$(C_1 - C_4)$ alkyl, $(C_1 - C_4)$ alkoxy -$(C_1 - C_4)$ alkyl or acetoxyethyl; $R_2$ is a hydrogen atom or a lower $(C_1 - C_4)$ alkyl group; X is a hydrogen or halogen atom, or a nitro or trifluoromethyl group; Y and Z are individually a hydrogen or halogen atom, or a lower $(C_1-C_4)$ alkyl or nitro group, from a reaction mixture containing the 2,3,4,5-tetrahydro form of the benzodiazepine derivative which comprises treating the reaction mixture with acetic anhydride to acylate the 2,3-,4,5-tetrahydro-1H-1,4-benzodiazepine derivative contained as impurity in the reaction mixture, neutralizing the resulting reaction mixture with an aqueous alkali solution and extracting with an organic solvent, re-extracting the separated organic layer with hydrochloric acid to recover only the hydrochloric acid salt of the compound (I) and then neutralizing the salt with an aqueous alkali solution.

2. A process according to claim 1, wherein the acylation is carried out in the presence of an inert organic solvent selected from the group consisting of tetrahydrofuran, benzene and toluene.

* * * * *